June 18, 1935.  S. DAWSON  2,005,023
AUTOMATIC CIRCULAR OVEN
Filed April 28, 1933    2 Sheets-Sheet 1
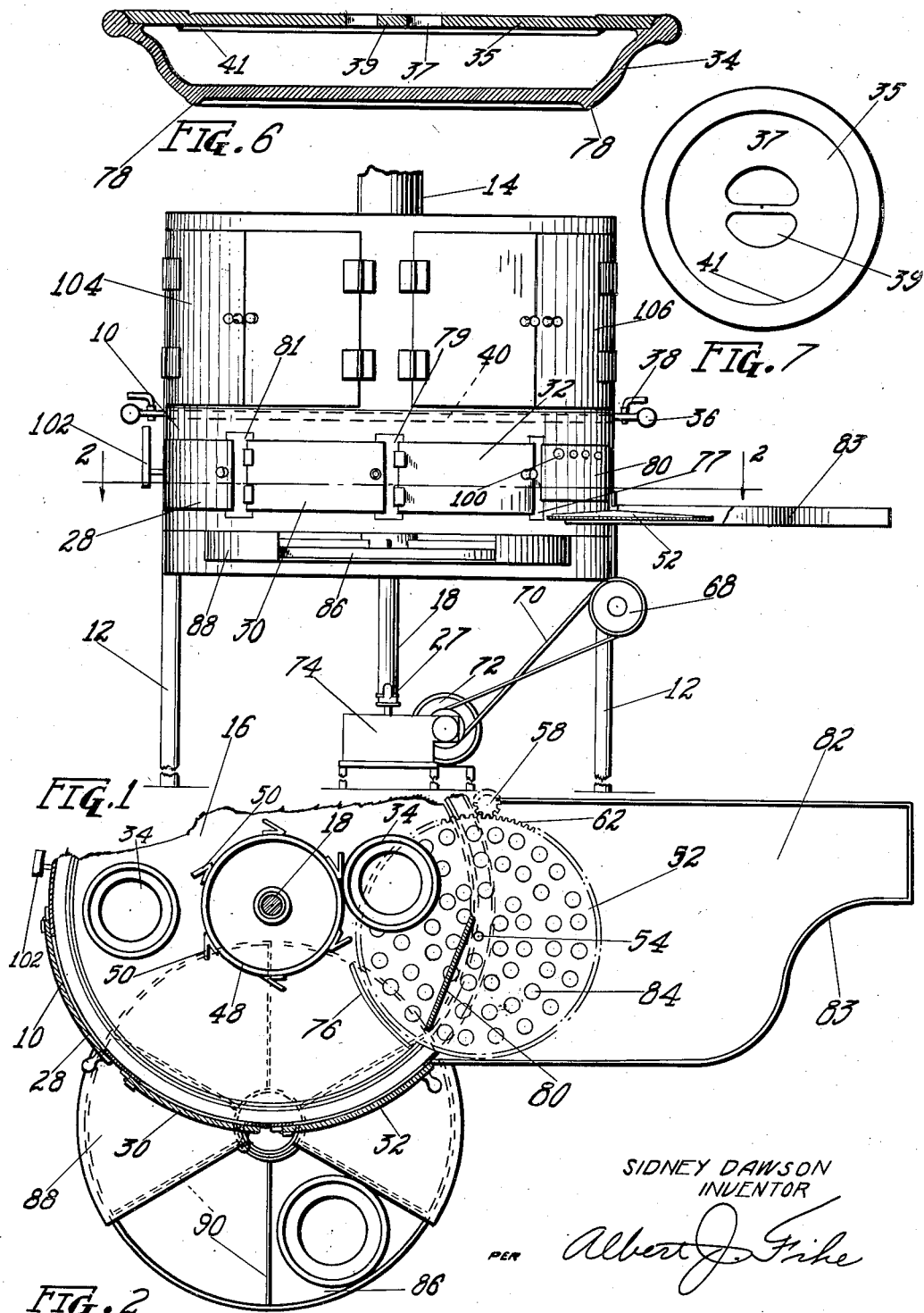
SIDNEY DAWSON
INVENTOR
PER Albert J. Fike
ATTORNEY June 18, 1935.  S. DAWSON  2,005,023
AUTOMATIC CIRCULAR OVEN
Filed April 28, 1933  2 Sheets-Sheet 2

SIDNEY DAWSON
INVENTOR

PER Albert J. Fihe
ATTORNEY

Patented June 18, 1935

2,005,023

UNITED STATES PATENT OFFICE 2,005,023

AUTOMATIC CIRCULAR OVEN

Sidney Dawson, Chicago, Ill., assignor to Eloise E. Stalle, Chicago, Ill., administratrix of the estate of Albert P. Stalle, deceased Application April 28, 1933, Serial No. 668,363

9 Claims. (Cl. 107—60)

This invention relates to an improved automatic circular oven and has for one of its principal objects the provision of an oven, principally for use in preparing foods, which upon the insertion of the food therein, shall automatically cook the same and then automatically discharge the cooked food ready to be served.

One of the important objects of this invention is to provide, in conjunction with the automatic circular oven, a plurality of containers for use in cooking food in the oven, such as metallic casseroles or the like, which containers shall be particularly adaptable for use with the oven and which are so constructed that the automatic discharge means incorporated into the oven shall act positively and efficiently upon said casseroles.

Another important object of the invention is the provision, in an automatic circular oven, of a further automatic pre-heating means for utensils to be used in the oven, whereby no heat or time is wasted in the preparation of food for consumption in the casseroles after the same have been placed in the oven and whereby the time required for such food preparation can be accurately predetermined and just as accurately regulated so far as the length of time of the food in its container in the oven is concerned.

Another object of the invention resides in the provision of additional food preparing spaces such as roasting or baking compartments in conjunction with the automatic feature which is particulary adaptable for grilled or similarly prepared foods, which roasting or baking compartments are situated above the grill compartment, whereby all the heat is efficiently utilized.

Another and still further important object is to provide in an automatic oven, a plurality of entrances for the insertion of food to be prepared thereinto, whereby the time of cooking for the food is predetermined and suitably controlled even in the face of slight variations of temperature within the oven itself.

Another and still further important object of the invention is the provision, in conjunction with a circular oven, of a suitable casserole or the like for containing food to be prepared, which casserole shall cooperate with the automatic ejecting means of the oven, so that after the food is cooked, the casserole will be automatically ejected at the proper time, thereby eliminating over-cooking or burning.

Other and further important objects of the invention will be apparent from the disclosures in the accompanying drawings and following specification.

The invention, in a preferred form, is illustrated in the drawings and hereinafter more fully described.

In the drawings:

Figure 1 is a front elevation of the improved automatic circular oven of this invention.

Figure 2 is a sectional view taken on the line 2—2 of Figure 1, looking in the direction indicated by the arrows.

Figure 6 is a sectional view of the improved casserole used in conjunction with the automatic oven of this invention.

Figure 7 is a top plan view of the casserole lid.

As shown in the drawings:

Figures 3, 8:
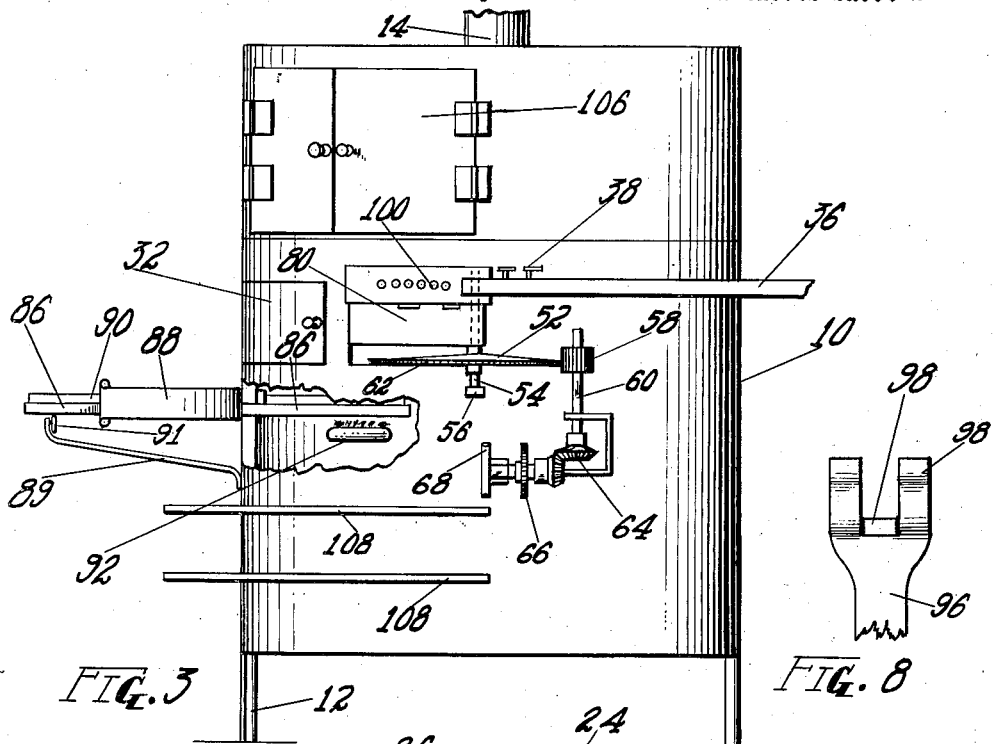
Figure 3 is a side elevation of the oven, parts being broken away.
Figure 8 is a detail view of one end of a device used for handling the casseroles.

The reference numeral 10 indicates generally the casing or body of the improved automatic circular oven of this invention, the same being supported on legs or the like 12 and having a flue 14 thereon providing for the escape of smoke, hot gases and the like.

Figures 4, 9:
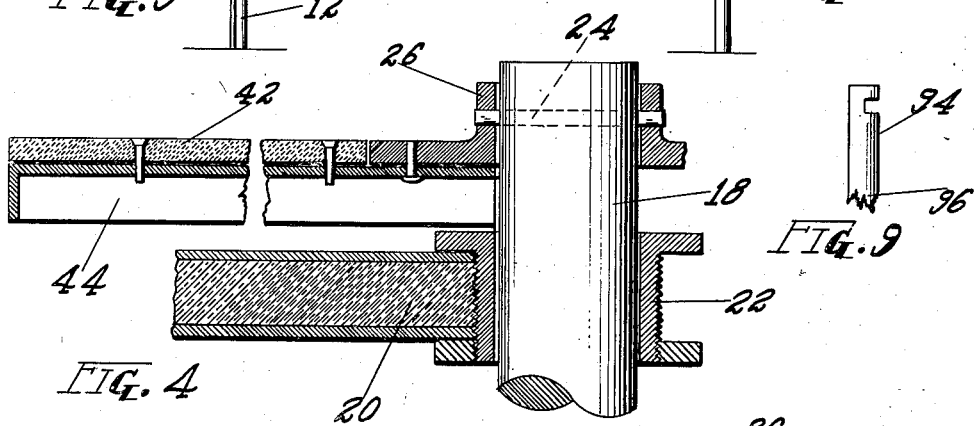
Figure 4 is a detail view, showing the central operating and supporting shaft with the rotatable platform and the insulated bottom.
Figure 9 is a detail view of one end of a handle element for shifting the casserole pre-heating device.

The main portion of the improved automatic circular oven of this invention comprises a rotatable table or the like 16, as best shown in Figure 2, which is mounted on a supporting shaft 18, the table itself being positioned adjacent the lower floor 20 of the oven, which, as best shown in Figure 4, includes a layer of insulating material between two metal layers, all provided with a bushing 22 through which the shaft 18 passes.

At its upper end, the shaft is pierced with an opening through which passes a removable pin 24, the ends of the pin fitting into a web member 26 comprising a portion of the rotatable table 16, whereby the table can be readily removed from the top of the shaft for purposes of cleaning, repairs, replacements, or the like.

The bottom of the shaft 18 is removably connected to a source of power by means of a joint 21 (Figure 1), whereby the shaft itself can be readily detached and also whereby undesirable conduction of heat from the shaft to the source of power is effectively avoided.

Figures 5, 10:
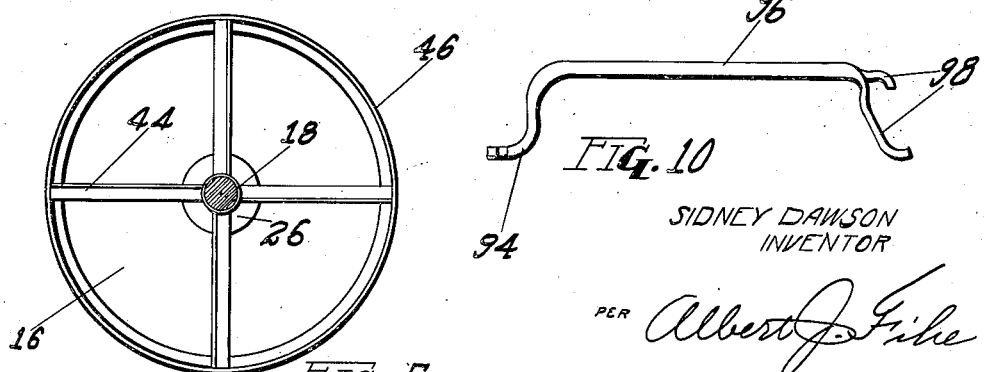
Figure 5 is a bottom plan view of the rotatable platform.
Figure 10 is a side elevation of a tool combining the uses of the devices shown in Figures 8 and 9, the tool having such devices incorporated thereinto at its respective ends.

Just above the level of the rotatable table 16 there is mounted in the sides of the casing 10 a plurality of doors 28, 30, and 32 respectively. These doors are adapted for the insertion of casseroles or the like 34 thereinto, which casseroles have been preliminarily heated and into which have been placed various and different articles of food which, it is desired, be prepared or cooked in the oven or grill. The oven is heated by means of any suitable fuel, as, for example, gas conducted through intake pipes or the like 36, controlled by valves 38 and leading into burners 40. These burners are positioned at a sufficient distance above the rotary table 16 so as to allow of a free passage of casseroles 34 thereunder, while at the same time subjecting the contents of the casseroles to sufficient heat from above and also from below, inasmuch as the rotary table comprises a surface of some heat retaining and heat resistant material as best illustrated at 42 in Figure 4. This is mounted upon suitably arranged supports such as angle irons or the like 44 as shown in Figures 4 and 5. These angle irons preferably are provided with downwardly turned edges 46 to form a circular outer depending flange for the table which is spaced a slight distance from the inner surface of the wall 10 of the oven casing.

The doors for the insertion of casseroles into the grill, and the door through which the casseroles are automatically ejected may be eliminated, and the grill will operate substantially as satisfactorily, inasmuch as very little heat is lost, even though the doors be omitted.

Positioned in the center of the rotating table and adapted to rotate therewith and extending for a substantial distance beyond the central supporting shaft is an annular element 48 having a series of projections 50 thereon which projections act to aid in ejecting the casseroles 34 from the oven during the operation thereof. This ejection is facilitated and eventually accomplished by means of a disk 52 mounted on a shaft 54 which shaft is mounted in a suitable bearing 56 fixed on the outer face of the oven casing 10, the disk extending through a suitable opening in the side of the casing partially into the oven proper as best shown in Figure 2.

The disk is rotated by means of a spur gear 58 mounted on a shaft 60 which shaft is also positioned outside the oven and which is in mesh with a series of gear teeth 62 formed in the outer periphery of the disk.

The shaft 60 is operated by means of a system of gears 64—66 which gears are, in turn, driven by a pulley 68 operated by a belt 70, which belt is taken off of the shaft from a motor 72, which motor, through a reduction gear contained in a housing 74 drives the main table rotating shaft 18.

Adjacent that portion of the periphery of the disk 52 which is between the ejector members 50 on the element 48 of the table and the inner wall of the casing is mounted a cooperating ejecting element 76 which is in the form of a fixed ledge whereby the casseroles 34 are prevented from being shunted from the disk 52 back onto the table 16 during the course of their travel around the interior of the oven.

A control means may be provided whereby the speed of rotation of the table may be regulated. This may be in the form of a rheostat or some other device for changing and fixing the speed of the driving motor.

The ejector element 76 is circularly curved as indicated to correspond with the periphery of the ejecting disk 52 and is high enough to effectively block a casserole and aid in its expulsion through the swinging door 80. The ejecting element 76 is mounted on a removable support 77 which, like the supports 79 and 81 between the doors 28, 30, and 32, is wholly removable, this being for the purpose of providing an easy withdrawal of the table 16 or the burners in the event that repairs or replacement ever become necessary. This also provides for a much easier cleaning operation, if desired.

It will be noted that a casserole 34 placed on the table 16 will remain thereon in its slow rotation through the oven until it contacts with the disk 52 which rotates in a counter clockwise direction as distinguished from the clockwise rotation of the table. The ejecting elements 50 assist in propelling the casserole from the table onto the ejecting disk 52, and this action is accelerated by the peculiar construction of the casseroles themselves. This construction consists essentially of an angular ledge 78 formed integral with the bottom of the casserole as best shown in Figure 6 and which has its outer edge rounded and curved inwardly so as to permit a free entry of the edge of the ejecting disk 52 thereunder.

After the casserole has been pushed into the ejecting disk 52, the rotation of the disk will bring it into contact with the ledge 76, whereupon the casserole will then be forced out of the oven through a hinged swinging door 80 and onto a dispensing shelf 82, which shelf has a protecting rim 83 there-around to prevent accidental spilling of the casserole therefrom.

It will be noted that the ejecting disk 52 has a plurality of holes 84 therein which prevent undesirable buckling under the varying conditions of heat and cold to which it is subjected in its rotation.

Positioned immediately beneath the rotating table 16 is a casserole pre-heater comprising essentially a rotatable table or the like 86 inclosed in a casing 88 which casing extends forwardly from the oven proper as best shown in Figures 2 and 3.

This rotatable element 86 is divided into a number of sections by means of partitions 90, each of the sections adapted to receive and retain a casserole, and which are of a sufficient height to allow a casserole to pass under the upper face of the casing 88 when the table 86 is rotated.

The table is adapted to rotate about a central point as indicated in Figure 2 and as best shown in Figure 3, it is supported at its outer periphery by means of a bracket 89 which has a roller 91 mounted at its end to permit of ready rotation of this pre-heating table.

A heating element 92 is preferably positioned beneath the table 86, this heating element being inside the oven casing, so that that portion of the preheating table 86 which is within the oven will receive a considerable degree of heat, and any casseroles thereon will be accordingly further preheated. It is an object of the invention to keep the pre-heater 86 filled with casseroles, and as one is desired, the pre-heater is manually turned by pushing against one of the partitions 90 with a suitable implement or by clamping the end 94 of the implement 96 (Figures 9 and 10) against the upturned outer lip of the table 86, whereby a turning movement can be easily effected. In this manner, a hot casserole is always available when desired, and the cooking of the food therein is accordingly accelerated.

The heating element 92 is simply an auxiliary device, as, in the usual operation of this oven, sufficient heat is generated by the hand burners to pre-heat the casseroles. However, the auxiliary heater is available, if necessary, and furthermore, the same can be used in the actual preparation of foods of certain types, some of which might not be feasible in the main grill, and the pre-heater can also be used for cooking purposes in the event that the main grill is filled.

Hot casseroles are removed from the pre-heater 86 by gripping them with the other end of the implement 96 which comprises hook elements as best shown at 98 in Figures 8 and 10.

The partitions 90 are lower than the height of the casing 88, so that a suitable influx of air between the upper edge of the partitions and the lower surface of the cover 88 is provided, which results in a necessary amount of draft or air intake to the interior of the oven which is also supplemented by means of ventilating openings 100 in the door 80.

Positioned adjacent the turn-table 16 and the grill chamber is a thermometer or the like 102, whereby the temperature of the grill chamber and oven can be accurately determined, and the length of time of the passage of foods through the oven be accurately regulated. This is controlled by placing the food to be prepared in either one of the doors 28, 30 or 32, as, if a shorter cooking time is desired, the door 28 is used; for medium cooking, the door 30; and for a longer cooking, the door 32. Gradations of this time can be accomplished by inserting the casseroles to the left or right of the corresponding doors as desired, this depending upon the temperature of the oven and the particular nicety of time exposure in the oven decided upon by the chef.

Mounted above the burners 40 and preferably separated therefrom by a layer of insulating material, and at least by a suitable partition is a plurality of baking or roasting chambers provided with doors 104 and 106 as best shown in Figures 1 and 3. These baking and roasting chambers can be used for the preparation of roasts, fowls, and other baking purposes, while the grill portion of the oven with the open frame and rotatable table is particularly adapted for the preparation of what is known as short orders, such as steaks, chops, broiled ham, etc., etc. Many modifications and variations of the method of preparation and the foods to be prepared may, of course, be used, depending in a great degree upon the versatility of the chef.

As best shown in Figures 6 and 7, the casseroles 34 are provided with removable lids 35 which lids have a central opening 37 and a crossbar or the like 39 which comprises a handle for the lid. An annular groove or recess 41 is provided in the lid 35 into which the annular lower projection 78 of the corresponding casserole is adapted to fit for nesting purposes. The covers are used for the preparation of foods which do not require a direct exposure to an open flame. Suitable shelves 108 are provided in the front portion of the oven and are mounted on the casing 10 for the placing thereon of other casseroles or articles of food, or for any other suitable or desired purpose.

While the grill portion of the oven is shown as including only one rotatable table 16 and only one compartment, it is evident that two or more compartments and grills may be provided by simply increasing the effective height of the main shaft 18 and adding a corresponding number of rotating tables 42—44 together with associated burners 40.

It will be evident that herein is provided a combined circular oven and grill wherein the preparation of foods is rendered easy and accelerated to a great degree, while at the same time, tasty, appetizing dishes will result. Additionally, the fact that the food is prepared in such a manner and in such a device that the same can be always under the immediate inspection of the purchaser or consumer renders the apparatus novel, interesting and attractive.

The use of a certain type of nestable casserole in association with the oven and ejecting means also provides a combination which, in addition to being novel, is useful and economical.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. An automatic grill, comprising a rotatable table, a source of heat above the table, the table adapted to have placed thereon a plurality of casseroles for exposing articles of food to the heat for a predetermined length of time, together with means for automatically removing the casseroles from the table at the end of said predetermined length of time, said means comprising an ejecting disk, and a common source of power for operating the rotating table and the ejecting disk.

2. An automatic grill, comprising a rotatable table, a source of heat above the table, the table adapted to have placed thereon a plurality of casseroles for exposing articles of food to the heat for a predetermined length of time, together with means for automatically removing the casseroles from the table at the end of said predetermined length of time, said means comprising an ejecting disk, and a common source of power for operating the rotating table and the ejecting disk, said power means including a supporting shaft for the table, and pulley, gear and shaft connections from the same source of power to the ejecting disk.

3. An automatic grill, comprising a rotatable table, a source of heat above the table, the table adapted to have placed thereon a plurality of casseroles for exposing articles of food to the heat for a predetermined length of time, together with means for automatically removing the casseroles from the table at the end of said predetermined length of time, said means comprising an ejecting disk, and a common source of power for operating the rotating table and the ejecting disk, said power means including a supporting shaft for the table, and pulley, gear and shaft connections from the same source of power to the ejecting disk, and a series of gear teeth in the periphery of said ejecting disk adapted to cooperate with a driving gear therefor.

4. An automatic grill, including a casing, a series of doors in the casing, a table rotatable in the casing, a source of heat above the table, said table adapted to receive a plurality of food holding means for exposing articles of food to be cooked to the heat while on the table, and means for automatically removing said food holding means from the table at the expiration of a predetermined length of time, said last-named means including an ejecting disk, and a hinged door in the casing above said ejecting disk.

5. An automatic grill, including a casing, a series of doors in the casing, a table rotatable in the casing, a source of heat above the table, said table adapted to receive a plurality of food holding means, means for exposing articles of food to be cooked to the heat while on the table, and means for automatically removing said food holding means from the table at the expiration of a predetermined length of time, said last-named means including an ejecting disk, and a hinged door in the casing above said ejecting disk, together with elements cooperating with the ejecting disk for positively and automatically shifting the food holding means from the rotating table onto said ejecting disk.

6. An automatic grill, including a casing, a series of doors in the casing, a table rotatable in the casing, a source of heat above the table, said table adapted to receive a plurality of food holding means for exposing articles of food to be cooked to the heat while on the table, and means for automatically removing said food holding means from the table at the expiration of a predetermined length of time, and means associated with the grill for pre-heating said food holding means, said means comprising a rotatable casserole supporting shelf.

7. An automatic grill, including a casing, a series of doors in the casing, a table rotatable in the casing, a source of heat above the table, said table adapted to receive a plurality of food holding means for exposing articles of food to be cooked to the heat while on the table, and means for automatically removing said food holding means from the table at the expiration of a predetermined length of time, and means associated with the grill for pre-heating said food holding means, said means comprising a rotatable supporting shelf, said shelf mounted beneath the aforesaid rotatable table.

8. An automatic grill, including a casing, a series of doors in the casing, a table rotatable in the casing, a source of heat above the table, said table adapted to receive a plurality of food holding means for exposing articles of food to be cooked to the heat while on the table, and means for automatically removing said food holding means from the table at the expiration of a predetermined length of time, and means associated with the grill for pre-heating said food holding means, said means comprising a rotatable supporting shelf, said shelf mounted beneath the aforesaid rotatable table, and an auxiliary heating element for said casserole pre-heating means.

9. An ejecting element for automatic ovens, comprising a metal disk, and means for rotating the same, said disk being provided with a plurality of openings to prevent warping, and of a flattened conical shape to insure operating contact throughout its periphery with adjacent elements.

SIDNEY DAWSON.